(12) United States Patent
Konosu

(10) Patent No.: US 8,938,632 B2
(45) Date of Patent: Jan. 20, 2015

(54) SETTING POWER SAVING MODES BASED ON AMBIENT LIGHT AND USER SET TIME PERIODS

(71) Applicant: Canon Kabushiki Kaisha, Tokyo (JP)

(72) Inventor: Yuichi Konosu, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/773,393

(22) Filed: Feb. 21, 2013

(65) Prior Publication Data

US 2013/0222831 A1 Aug. 29, 2013

(30) Foreign Application Priority Data

Feb. 29, 2012 (JP) .................................. 2012-043960

(51) Int. Cl.
*H04N 1/00* (2006.01)
(52) U.S. Cl.
CPC ....... *H04N 1/00891* (2013.01); *H04N 1/00835* (2013.01); *H04N 1/00896* (2013.01); *H04N 2201/0094* (2013.01)
USPC ........................................................ 713/320
(58) Field of Classification Search
CPC .......... H04N 1/00891; H04N 1/00896; H04N 1/00835
USPC ........................................................ 713/320
See application file for complete search history.

(56) References Cited

U.S. PATENT DOCUMENTS

| 2009/0082910 A1* | 3/2009 | Sato .............................. 700/297 |
| 2009/0089597 A1* | 4/2009 | Sugita ........................... 713/320 |
| 2011/0296213 A1* | 12/2011 | Ferlitsch et al. .............. 713/320 |

FOREIGN PATENT DOCUMENTS

| JP | 2005-088521 A | 4/2005 |
| JP | 2011-013722 A | 1/2011 |

\* cited by examiner

*Primary Examiner* — Eric A Rust
(74) *Attorney, Agent, or Firm* — Canon U.S.A., Inc. IP Division

(57) ABSTRACT

An information processing apparatus configured to have a first power mode and a second power mode having lower power consumption than that of the first power mode includes a detection unit configured to detect brightness around the information processing apparatus, a setting unit configured to set a time period for shifting the information processing apparatus to the second power mode, and a control unit configured to, if the brightness detected by the detection unit is lower than a threshold, when a time is within the time period set by the setting unit, shift the information processing apparatus to the second power mode, and, when the time is not within the time period set by the setting unit, not to shift the information processing apparatus to the second power mode.

10 Claims, 17 Drawing Sheets

POWER-ON STATE

POWER SAVING STATE

POWER-OFF STATE

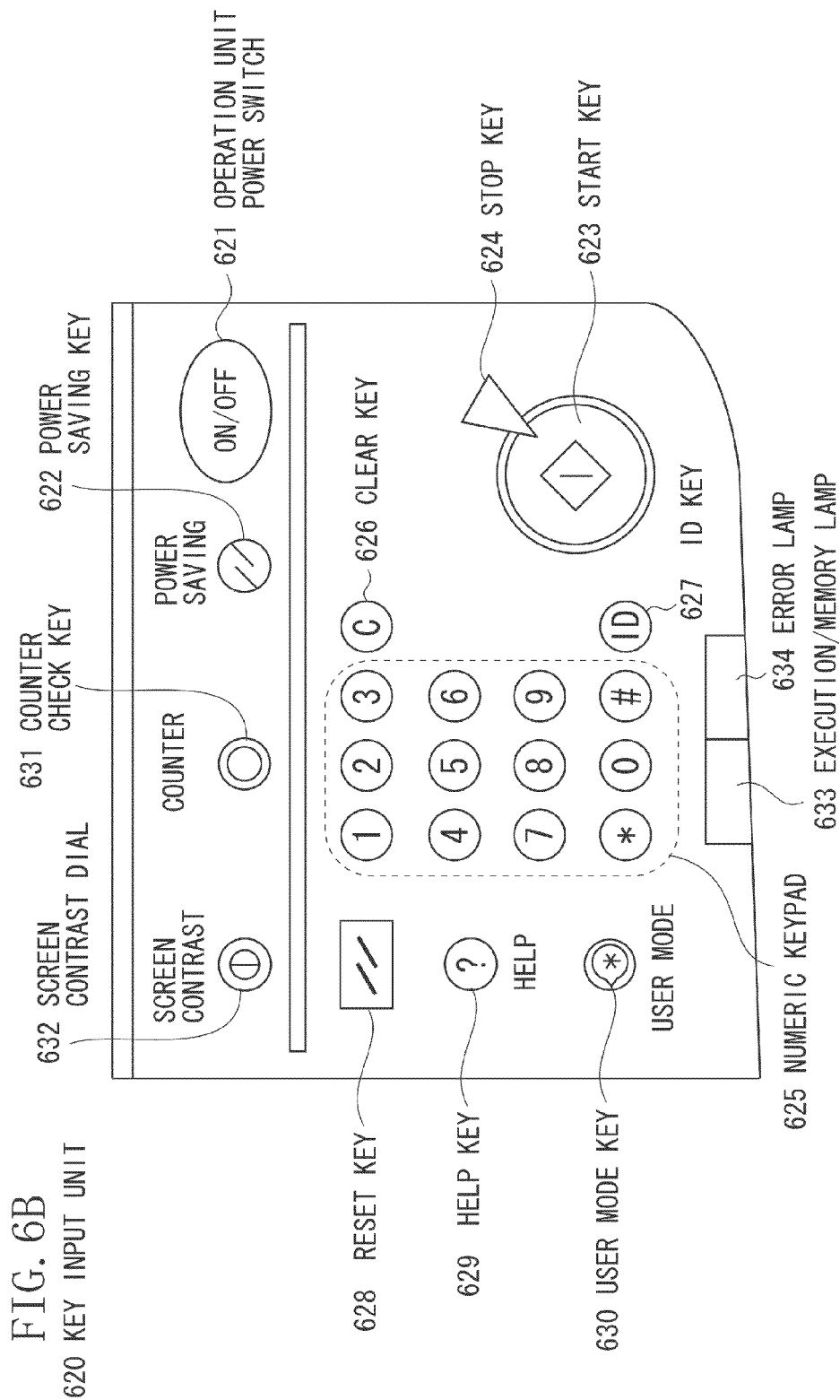

ILLUMINANCE DETECTION FUNCTION SETTING SCREEN

POWER SAVING STATE SHIFT TIME SETTING SCREEN

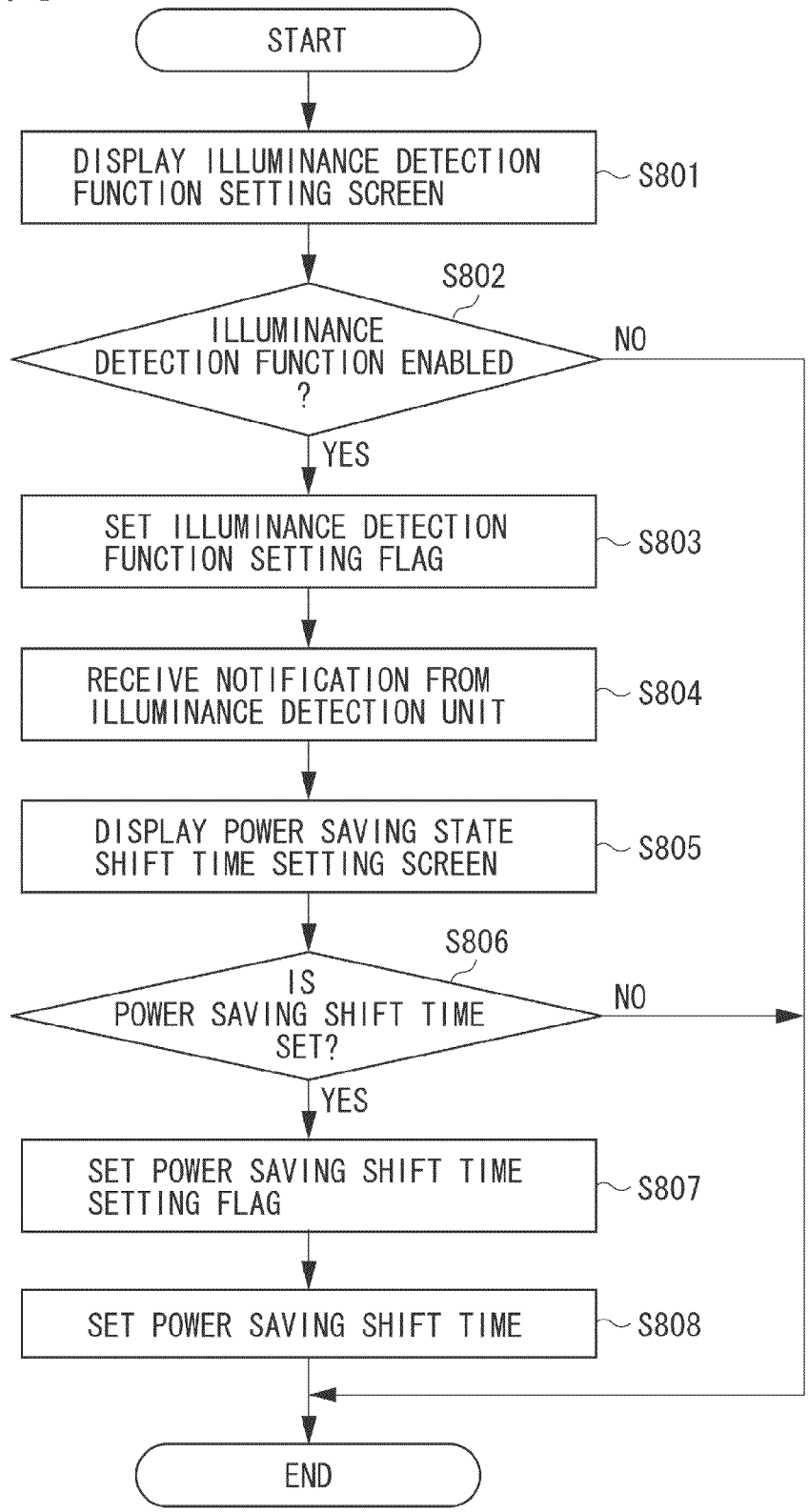

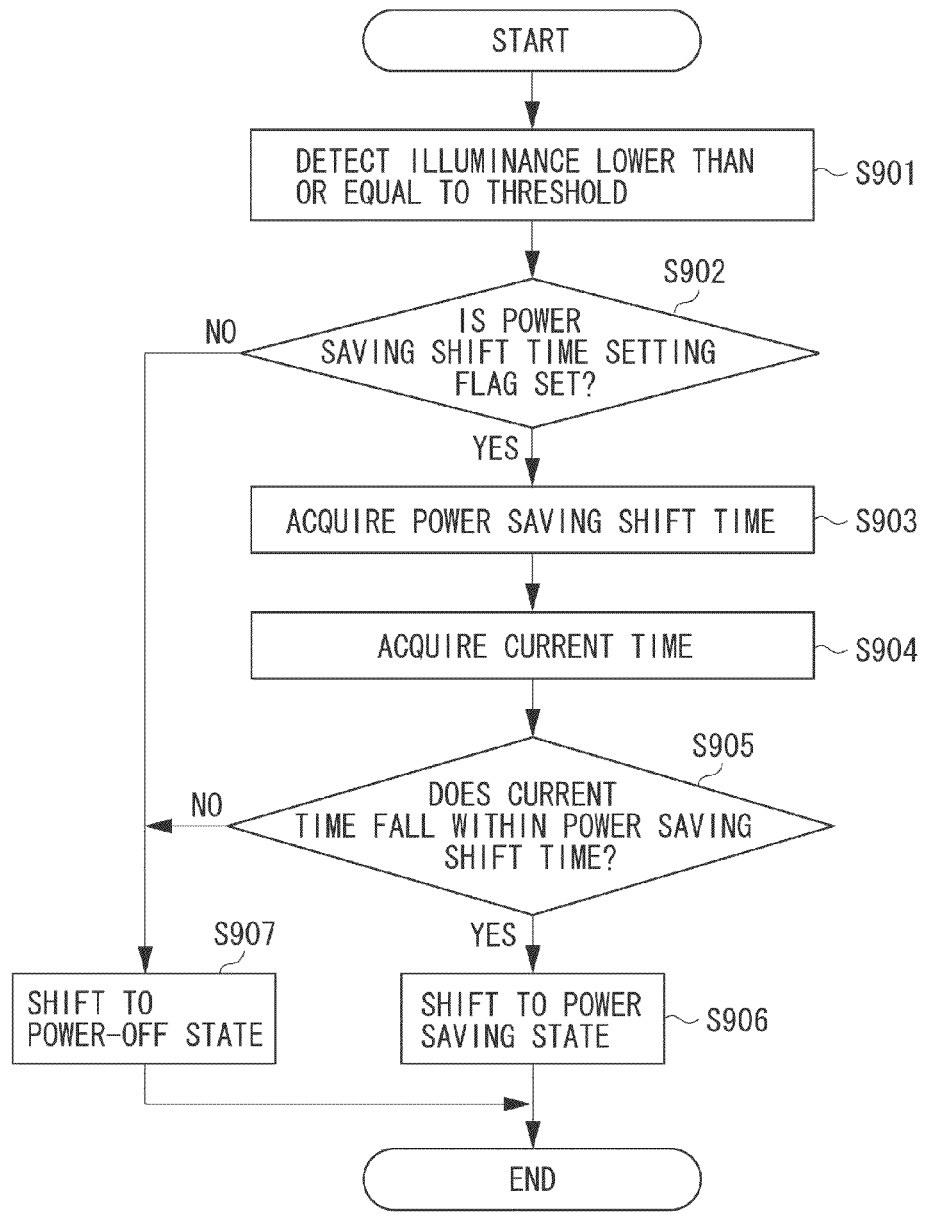

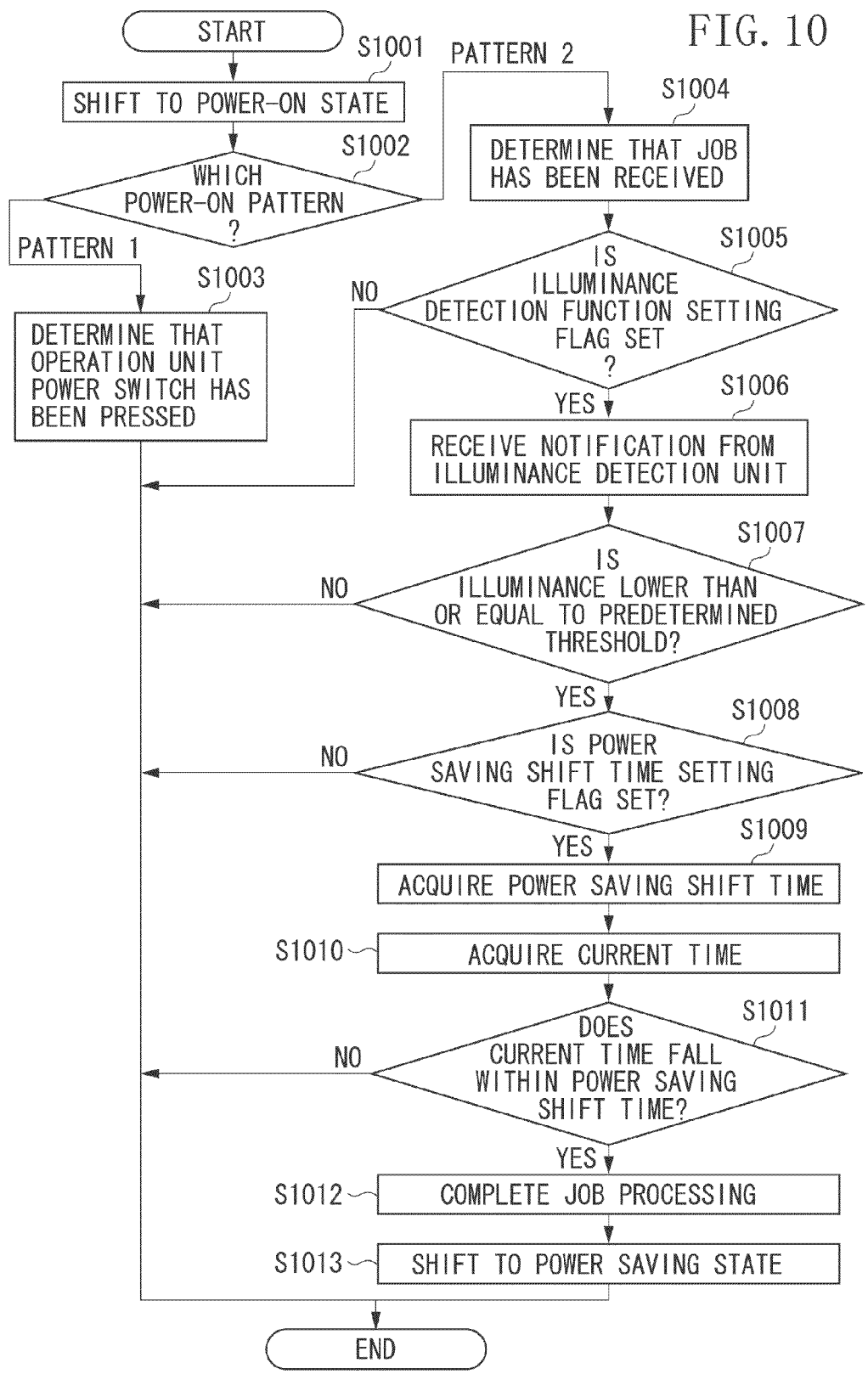

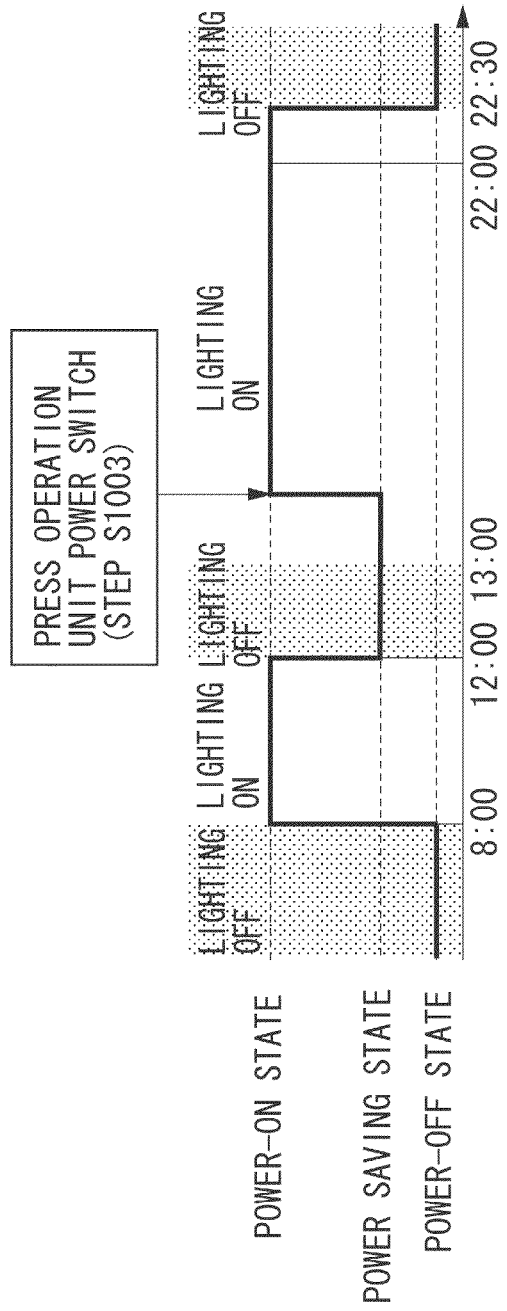

POWER TRANSITION DURING SPECIFIED TIME

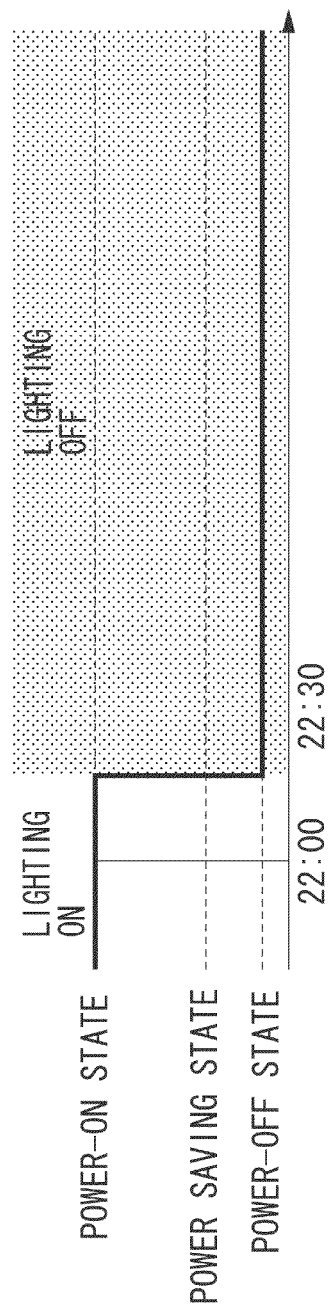

SETTING POWER SAVING MODES BASED ON AMBIENT LIGHT AND USER SET TIME PERIODS

BACKGROUND OF THE INVENTION

1. Field of the Invention

The present invention relates to a job processing apparatus capable of performing power saving control, a method for controlling power supply of a job processing apparatus, and a storage medium.

2. Description of the Related Art

In general, a job processing apparatus such as an image forming apparatus is often constantly powered on even in an unused time period. A problem has been to suppress power consumption of the apparatus in such a time period. As a method for suppressing the power consumption in such a time period, a function of turning off the power supply of the apparatus when the ambient illuminance of the apparatus is determined to be lower than or equal to a predetermined level based on the detection result by an illuminance sensor has been known (see Japanese Patent Application Laid-Open No. 2005-088521).

As for an information processing apparatus, a function of shifting the apparatus to a partially-energized power saving state or a power-off state according to a detection level of an illuminance sensor has been known (see Japanese Patent Application Laid-Open No. 2011-013722).

Suppose that a job processing apparatus to which the function discussed in Japanese Patent Application Laid-Open No. 2011-013722 is applied is used in an office. When the lighting in the office is turned off during break time, the job processing apparatus will be powered off. To use the job processing apparatus after the break, the main body of the apparatus needs to be powered on by a switch operation. Since startup processing of the job processing apparatus includes system preparations, it takes long to shift the apparatus from the power-off state to the power-on state. There has thus been a problem that the user is not able to use function processing using the job processing apparatus until after the startup processing of the job processing apparatus is completed.

SUMMARY OF THE INVENTION

The present invention is directed to a job processing apparatus which controls power supply in a manner adaptive to changes in the ambient illuminance of the job processing apparatus in a user-set time period, thereby realizing power supply control that satisfies both a demand for power saving and a demand for prompt job processing.

According to an aspect of the present invention, an information processing apparatus configured to have a first power mode and a second power mode having lower power consumption than that of the first power mode includes a detection unit configured to detect brightness around the information processing apparatus, a setting unit configured to set a time period for shifting the information processing apparatus to the second power mode, and a control unit configured to, if the brightness detected by the detection unit is lower than a threshold, when a time is within the time period set by the setting unit, shift the information processing apparatus to the second power mode, and, when the time is not within the time period set by the setting unit, not to shift the information processing apparatus to the second power mode.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 6A and 6B are plan views illustrating a configuration of the operation unit illustrated in FIG. 1

FIG. 8 is a flowchart illustrating a method for controlling the job processing apparatus.

FIG. 9 is a flowchart illustrating a method for controlling the job processing apparatus.

FIG. 10 is a flowchart illustrating a method for controlling the job processing apparatus.

FIGS. 11A, 11B, and 11C are time charts illustrating power transitions of the job processing apparatus.

DESCRIPTION OF THE EMBODIMENTS

Various exemplary embodiments, features, and aspects of the invention will be described in detail below with reference to the drawings.

It should be appreciated that the present invention according to the claims is not limited to the following exemplary embodiment, and all combinations of features described in the present exemplary embodiment are not necessarily indispensable to the solution by the present invention.

Figure 1:
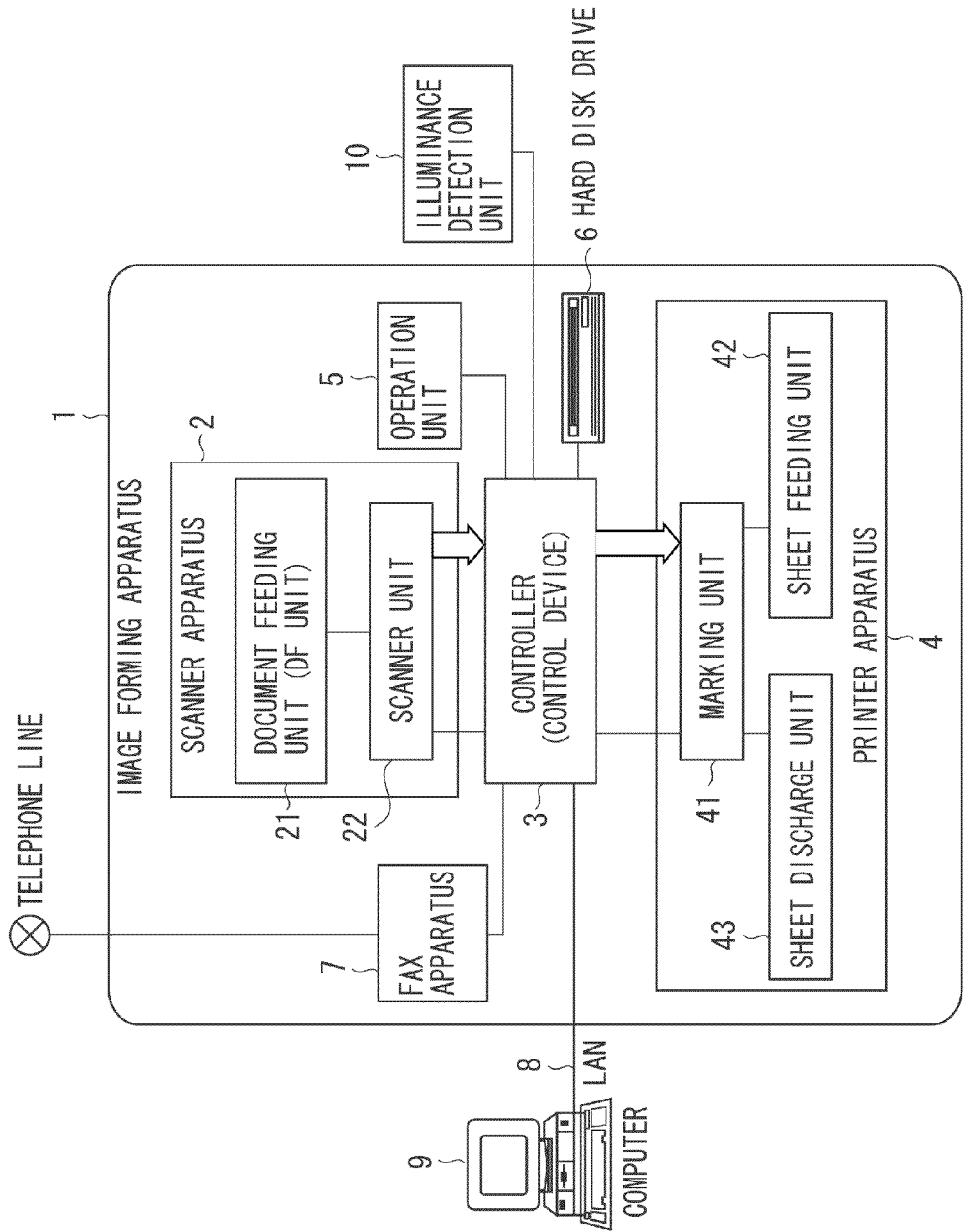
FIG. 1 is a block diagram illustrating a configuration of a job processing system according to an exemplary embodiment of the present invention.

FIG. 1 is a block diagram illustrating a configuration of a job processing system, to which a job processing apparatus described in the present exemplary embodiment is applied.

In the present exemplary embodiment, a multi function printer (MFP), which is an image forming apparatus, will be described as an example of the job processing apparatus. A printer apparatus, a facsimile apparatus, and other electronic apparatuses may be applied to the present exemplary embodiment instead. The present example corresponds to a job processing system in which a computer 9 and an image forming apparatus 1 communicate via a local area network (LAN) 8. The image forming apparatus 1 serving as an example of the job processing apparatus performs job processing by supplying power supplied from a power supply unit to individual components described below.

In FIG. 1, a scanner apparatus 2 optically reads an image from a document and converts the image into a digital image. A printer apparatus 4 outputs the digital image to a paper device. An illuminance detection unit 10 can notify a controller 3 of an ambient illuminance of the image forming apparatus 1.

An operation unit 5 of touch panel type accepts user's instructions and displays a setting state of the job processing system on a UI screen. A hard disk drive (HDD) 6 includes a nonvolatile memory. The HDD 6 stores a program for starting up the image forming apparatus 1, a setting file, and various types of system information including UI screen data.

A facsimile (FAX) apparatus 7 transmits and receives digital image data to/from a telephone line. The controller 3 controls a scanner unit 22 to control document reading. The controller 3 may receive print data based on a page description language (page-description language (PDL) data) from the computer 9. The controller 3 renders the read image data and/or the received print data into image data and outputs the rendered image data to a recording sheet by using a marking unit 41.

The computer 9 can input and output digital images from/to the image forming apparatus 1, issue a job, and issue an instruction to devices through the LAN 8.

The scanner apparatus 2 includes a document feeding unit 21 and the scanner unit 22. The document feeding unit 21 can automatically replace bundles of documents in succession. The scanner unit 22 can optically scan and convert a document into a digital image. The converted image data is transmitted to the controller 3.

The printer apparatus 4 includes a sheet feeding unit 42, the marking unit 41, and a sheet discharge unit 43. The sheet feeding unit 42 can feed each single sheet of paper out of a paper bundle in succession. The marking unit 41 is intended to print image data on the fed paper. The sheet discharge unit 43 discharges the printed paper.

The image forming apparatus 1 can perform various jobs. Examples of function processing based on multiple functions processing will be described below.

The image forming apparatus 1 has a copying function. The image forming apparatus 1 records an image read by the scanner apparatus 2 into the HDD 6, and simultaneously performs printing by using the printer apparatus 4.

The image forming apparatus 1 has an image transmission function. The image forming apparatus 1 transmits an image read from the scanner apparatus 2 to the computer 9 through the LAN 8.

The image forming apparatus 1 has an image storage function. The image forming apparatus 1 records an image read from the scanner apparatus 2 into the HDD 6, and performs image transmission and/or image printing when needed.

The image forming apparatus 1 has an image printing function. For example, the image forming apparatus 1 analyzes a page description language transmitted from the computer 9, and performs printing by using the printer apparatus 4.

Figure 2:
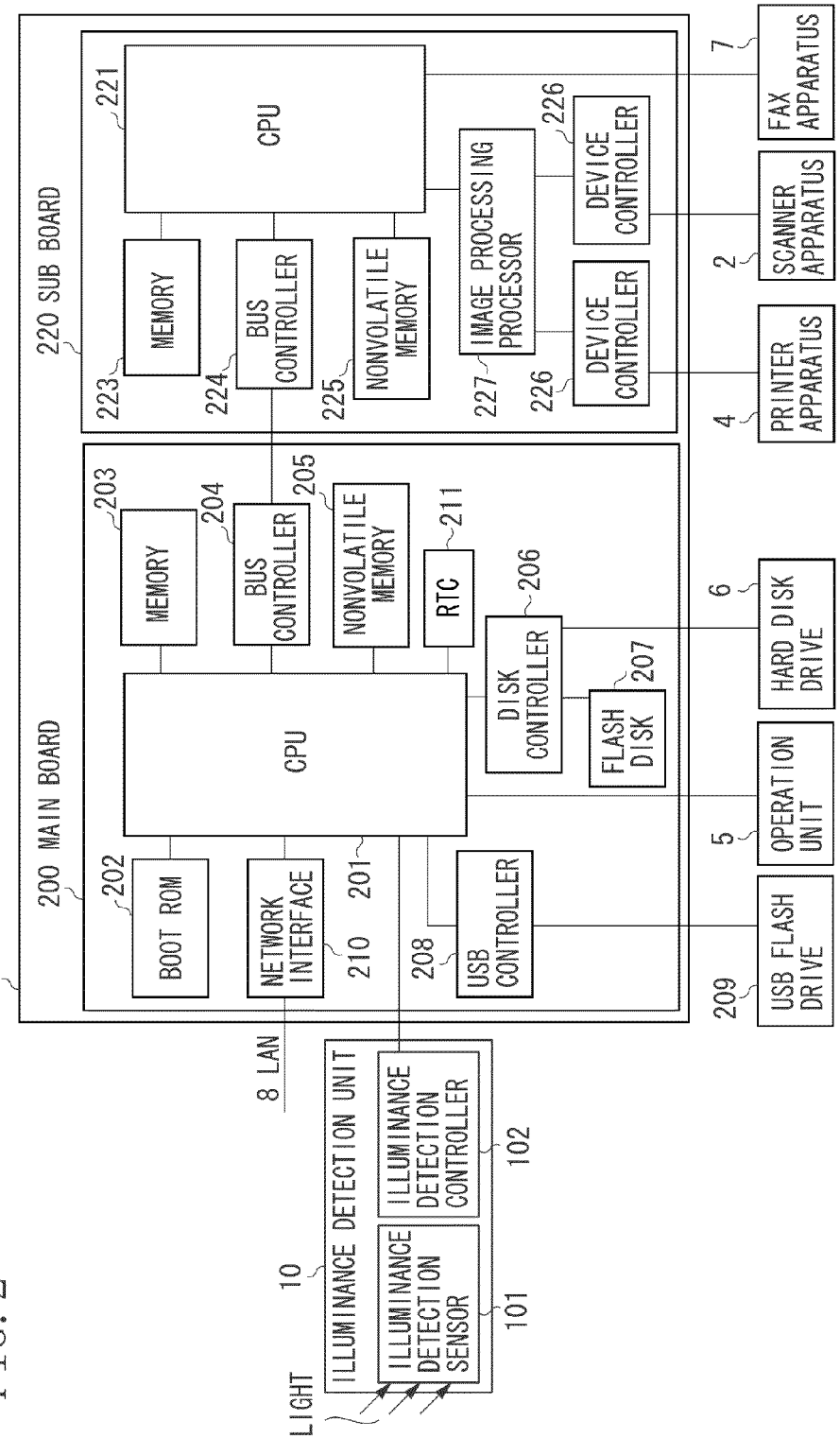
FIG. 2 is a block diagram illustrating a configuration of the controller illustrated in FIG. 1.

FIG. 2 is a block diagram illustrating a configuration of the controller 3 illustrated in FIG. 1. The controller 3 described in the present example includes a main board 200 and a sub board 220. The present exemplary embodiment deals with an example where a memory 203 is used as a first storage unit that stores information for restoring the job processing system during a power saving mode, and a flash disk 207 is used as a second storage unit.

In FIG. 2, an illuminance detection sensor 101 is included in the illuminance detection unit 10, which detects the illuminance of light emitted from the lighting of an office room where the image forming apparatus 1 is installed. The illuminance detection sensor 101 includes, for example, a photodiode which detects and converts light into a current value (a photocurrent). An illuminance detection controller 102 amplifies and converts the photocurrent into a voltage value to perform a comparison to determine whether the voltage value is lower than or equal to a predetermined level, and notifies a central processing unit (CPU) 201 of the result.

The main board 200 includes a general-purpose CPU system. The main board 200 includes the CPU 201 which controls the entire main board 200, a boot read-only memory (ROM) 202 which contains a boot program, and the volatile memory 203 which the CPU 201 uses as a work memory. The main board 200 further includes a bus controller 204 which has a bridge function for an external bus, and a nonvolatile memory 205 which can retain data even during power-off.

The main board 200 further includes a disk controller 206, which controls storage devices, and the flash disk (a solid state drive (SSD)) 207. The flash disk 207 is a nonvolatile storage device having a relatively small capacity, and composed of a semiconductor device or devices. The main board 200 further includes a real-time clock (RTC) 211 which runs on a built-in battery, and a Universal Serial Bus (USB) controller 208 which is capable of USB control. The SSD is an example of a semiconductor disk memory.

The main board 200 is externally connected with a USB flash drive 209 as well as the operation unit 5 and the HDD 6 illustrated in FIG. 1.

The sub board 220 includes a relatively small general-purpose CPU system and image processing hardware. The sub board 220 includes a CPU 221, which controls the entire sub board 220, and a memory 223, which the CPU 221 uses as a work memory. The sub board 220 further includes a bus controller 224, which has a bridge function for an external bus, and a nonvolatile memory 225, which can retain data even during power-off.

The sub board 220 further includes an image processing processor 227, which performs real-time digital image processing, and device controllers 226. The external scanner apparatus 2 and the external printer apparatus 4 exchange digital image data through the device controllers 226. The FAX apparatus 7 is directly controlled by the CPU 221.

It should be noted that FIG. 2 is a simplified block diagram. For example, the CPUs 201 and 221 include a large number of pieces of CPU peripheral hardware, such as a chip set, a bus bridge, and a clock generator. Such components are simplified in view of the unnecessity for the description, whereas the exemplary embodiment of the present invention is not limited to such a block configuration.

An operation of the controller 3 will be described below by using image copying processing for reading and printing a document image as an example.

When the user issues an instruction to copy an image from the operation unit 5, the CPU 201 sends an image reading command to the scanner apparatus 2 through the CPU 221 in the sub board 220.

The scanner apparatus 2 optically scans and converts a paper document into digital image data, and inputs the digital image data into the image processing processor 227 through the device controller 226.

The image processing processor 227 performs a direct memory access (DMA) transfer to the memory 223 via the CPU 221 in the sub board 220, so that the memory 223 temporarily stores the digital image data.

If a certain amount or all of the digital image data is determined to be stored in the memory 223, the CPU 201 issues an image output instruction to the printer apparatus 4 via the CPU 221.

The CPU 221 in the sub board 220 informs the image processing processor 227 of the location of the digital image data in the memory 223. The digital image data in the memory 223 is transmitted to the printer apparatus 4 via the image processing processor 227 and the device controller 226 according to a synchronization signal from the printer apparatus 4. The printer apparatus 4 prints the digital image data on a paper device.

When printing a plurality of copies, the CPU 201 stores the digital image data having been stored in the memory 223 in the HDD 6. The CPU 201 can thus transmit the image data to the printer apparatus 4 for the second and subsequent copies without acquiring the image data from the scanner apparatus 2.

Figure 3:
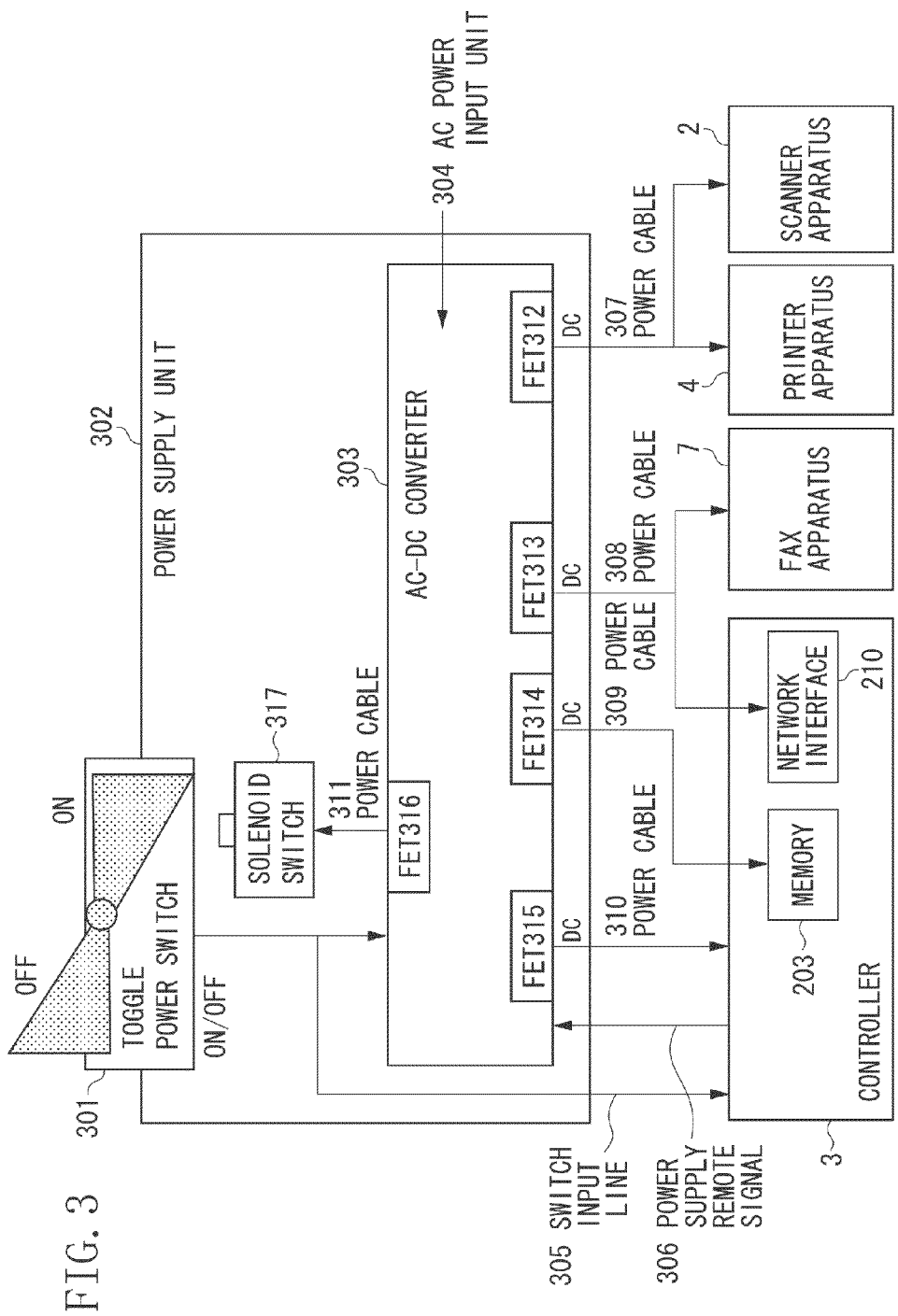
FIG. 3 is a diagram illustrating a configuration of a power supply unit of the image forming apparatus illustrated in FIG. 1.

FIG. 3 is a diagram illustrating a configuration of a power supply unit in the image forming apparatus 1 illustrated in FIG. 1. The same components to those in FIGS. 1 and 2 are designated by the same reference numerals.

In FIG. 3, the power supply unit 302 includes a toggle power switch 301, an alternating-current-to-direct-current (AC-DC) converter 303, and an alternating-current (AC) power input unit 304. A switch input line 305 notifies the controller 3 of a state of operation of the toggle power switch 301 by the user. The controller 3 outputs a power supply remote signal 306 to the AC-DC converter 303 as a signal for controlling the output of the AC-DC converter 303. The AC-DC converter 303 includes a plurality of field-effect transistors (FETs) 312 to 316.

A power cable 307 supplies direct-current (DC) power to the printer apparatus 4 and the scanner apparatus 2. A power cable 308 supplies power to the FAX apparatus 7 and the network interface 210 of the controller 3. A power cable 309 supplies power to the memory 203 of the controller 3.

A power cable 310 supplies power to the flash disk 207 of the controller 3. A power cable 311 supplies power to the other components of the controller 3.

The FETs 312 to 316 included in the AC-DC converter 303 are switches that can turn on/off the power supply lines 307 to 311, respectively. The FETs 312 to 316 are individually controlled by the power supply remote signal 306 described above. The user can operate the toggle power switch 301 to power on/off the image forming apparatus 1.

When the toggle power switch 301 is turned on, the toggle power switch 301 connects to the AC-DC converter 303 and can control an energization state of the power supply.

When the toggle power switch 301 is turned off, the power supply needs to be maintained until the controller 3 completes shutting down of the job processing system. In other words, the state of the toggle power switch 301 is notified through the switch input line 305, and after the completion of the shutdown, all the DC power supplies are turned off by using the power supply remote signal 306. Such a description applies to the power supply configuration of typical devices that need a shutdown.

The toggle power switch 301 is a switch that mechanically maintains either one of on and off states. The user inputs the state by operating the toggle power switch 301 with changing over to either one of the on or off side.

While the present exemplary embodiment uses the toggle power switch 301 whose on and off are explicit, many personal computers (PCs) use a stateless power switch (including a power switch that itself functions as a power saving shift switch). Such a stateless switch functions: 1. as an "off" switch when the apparatus is powered on; and 2. as an "on" switch when the apparatus is powered off. Other control patterns may include: 3. functioning as a "forced-off" switch when the switch continues to be pressed for more than a certain period of time.

The present exemplary embodiment is not limited to the toggle power switch. If a stateless switch is employed, the turning on and off of the toggle switch may be applied to the foregoing on/off patterns 1 and 2.

Figure 4:
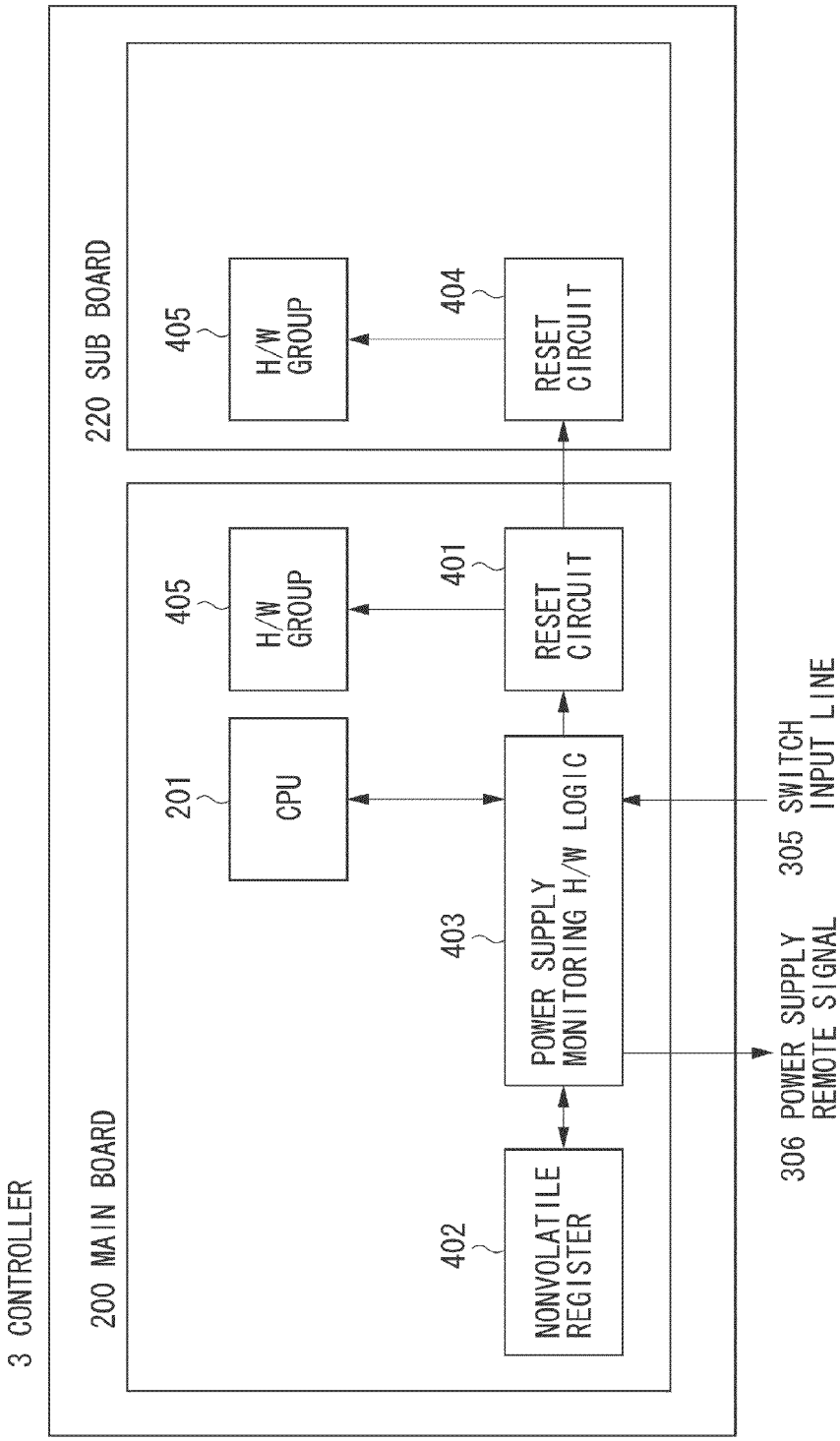
FIG. 4 is a block diagram illustrating a configuration of the controller illustrated in FIG. 2.

FIG. 4 is a block diagram illustrating a configuration of the controller 3 illustrated in FIG. 2. The present example provides a configuration example of the controller 3 with emphasis on power supply control and reset circuits.

In FIG. 4, the main board 200 includes a reset circuit 401. A nonvolatile register 402 can retain its state even in the event of a hardware (H/W) reset. Dedicated power supply monitoring H/W logic 403 monitors the power supply control of the job processing system. If the power supply monitoring H/W logic 403 includes application specific integrated circuit (ASIC), the main board 200 may be a small CPU system.

The sub board 220 includes a reset circuit 404. The main board 200 and the sub board 220 include respective H/W groups 405.

Synchronous hardware will not retain its internal state when reset. After H/W circuits of synchronous configuration are powered on and each chip is supplied with power, the reset circuits 401 and 404 therefore need to reset the respective H/W groups 405. Since a plurality of H/W chips has a master-slave relationship, a reset sequence is designed to reset the H/W chips in order.

For such a reason, like the present exemplary embodiment, each board typically includes a reset circuit so that such reset circuits perform reset operations in the respective boards. The system of the main board 200, in particular, constitutes a principal board of the image forming apparatus 1, and includes the power supply monitoring H/W logic 403.

The switch input line 305 from the toggle power switch 301, indicating the state of the toggle power switch 301, is connected to the power supply monitoring H/W logic 403. The power supply monitoring H/W logic 403 has a function capable of controlling the power supplies to the respective components of the image forming apparatus 1 by using the power supply remote signal 306.

When the CPU 201 can operate normally, the job processing system can be reset according to an instruction from the CPU 201. When the CPU 201 is not supplied with power, the power supply remote signal 306 can be controlled via the input from the switch input line 305 connected to the power switch 301, whereby the controller 3 is powered on. The nonvolatile register 402 can be read and written by the CPU 201.

With the image forming apparatus 1 having the foregoing H/W configuration, suppose, for example, that the user makes an operation to turn off the toggle power switch 301. In such a case, the CPU 201 can receive the state of the toggle power switch 301 via the path of the switch input line 305 and the power supply monitoring H/W logic 403. Detecting the power-off, the CPU 201 typically runs a shutdown sequence and issues a shutdown instruction to the power supply monitoring H/W logic 403.

As a result, the AC-DC converter 303 is notified of the power-off via the power supply remote signal 306. The AC-DC converter 303 turns off the power supply lines 307 to 311 for supplying the DC power, whereby the entire job processing system is shut down.

The foregoing is a typical operation of an image forming apparatus, and corresponds to the operation of the image forming apparatus 1 of the present exemplary embodiment when a startup time reduction function is not enabled. Since such a shutdown terminates all the programs on the CPU 201, the programs of the CPU 201 start up as usual when the toggle power switch 301 is turned on the next time.

Figure 5A:
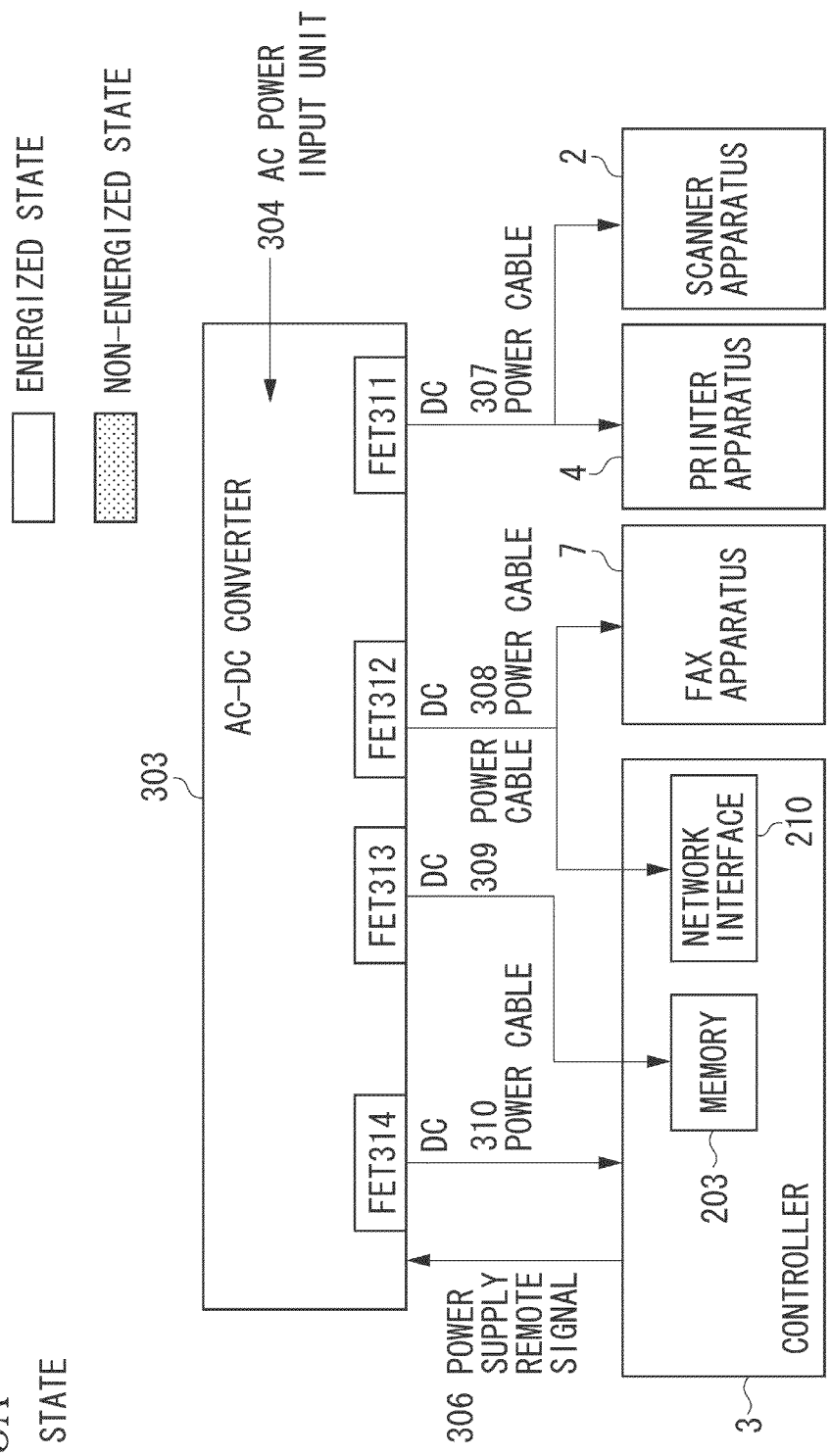
FIGS. 5A, 5B, and 5C are diagrams illustrating power supply control states of a job processing apparatus described in the exemplary embodiment.
Figure 5B:
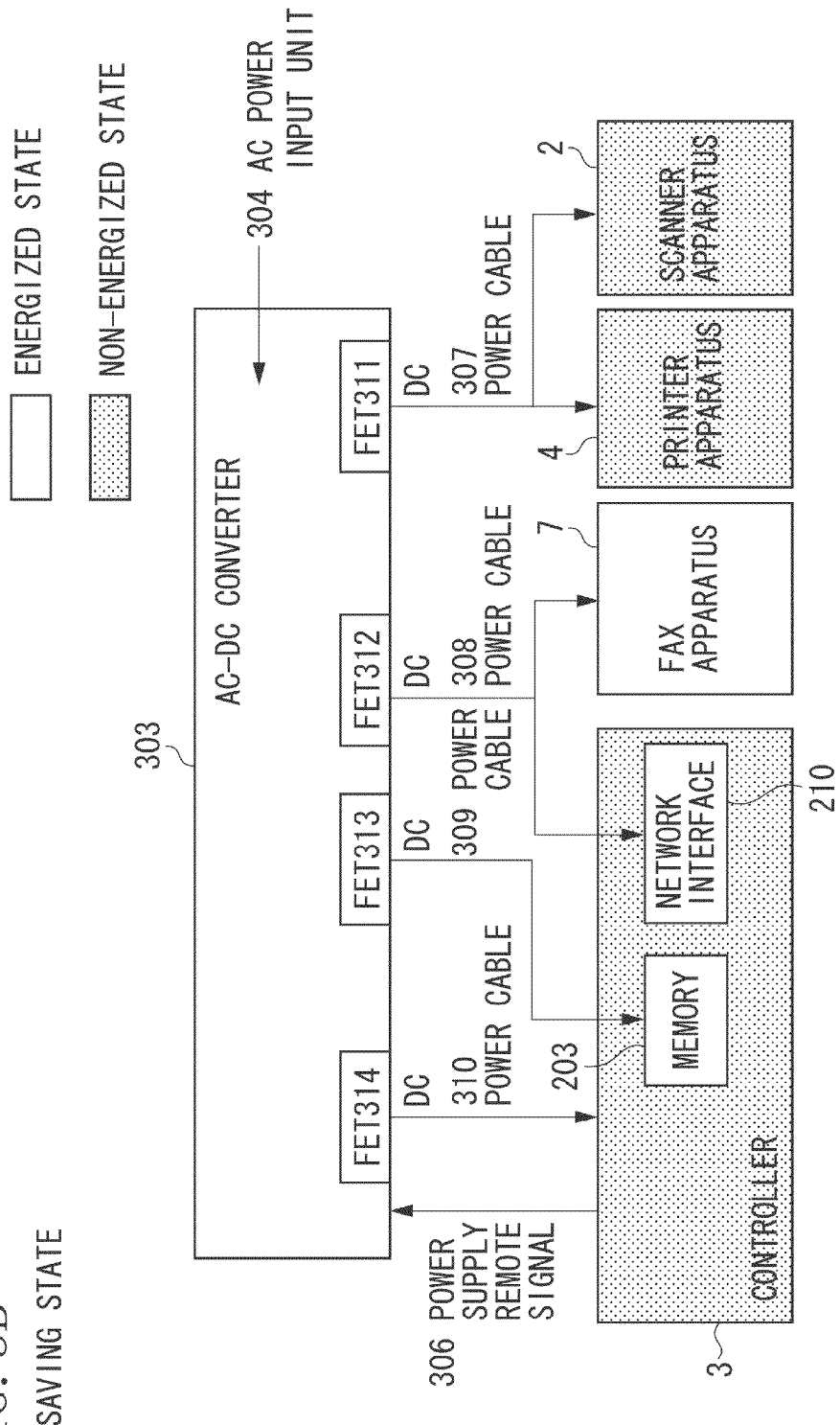
Figure 5C:
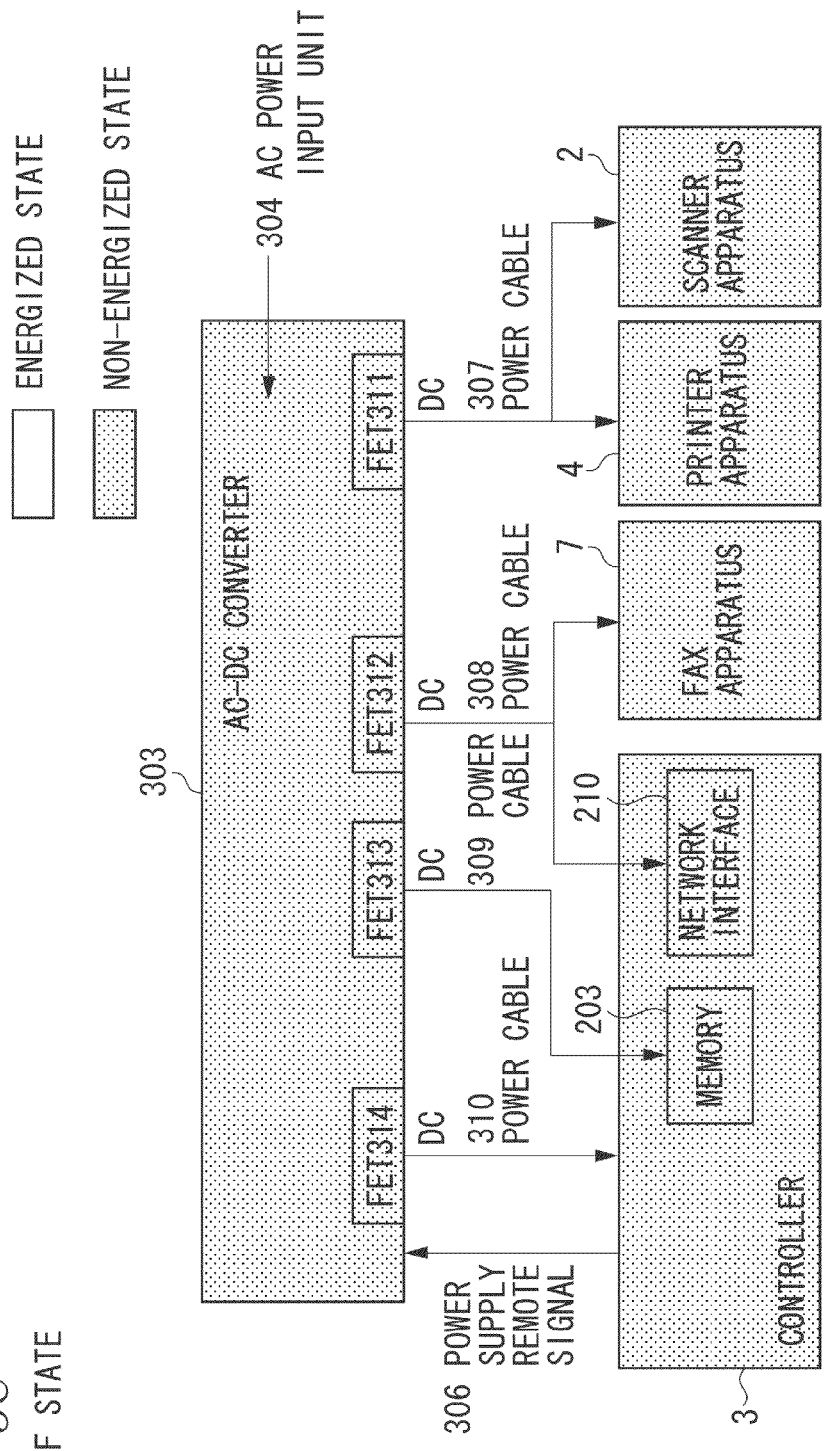

FIGS. 5A, 5B, and 5C are diagrams illustrating states of power supply control of the job processing apparatus according to the present exemplary embodiment. The present example provides a processing example for reducing a system startup time when the image forming apparatus 1 is powered on the next time.

FIG. 5A illustrates a power-on state or normal activation state where the entire job processing system is energized. FIG. 5B illustrates a power saving state where the memory 203, the network interface 210, and the FAX apparatus 7 are energized and can accept a job from the outside.

FIG. 5C illustrates a power-off state where the entire job processing system is in a non-energized state.

Figure 6A:
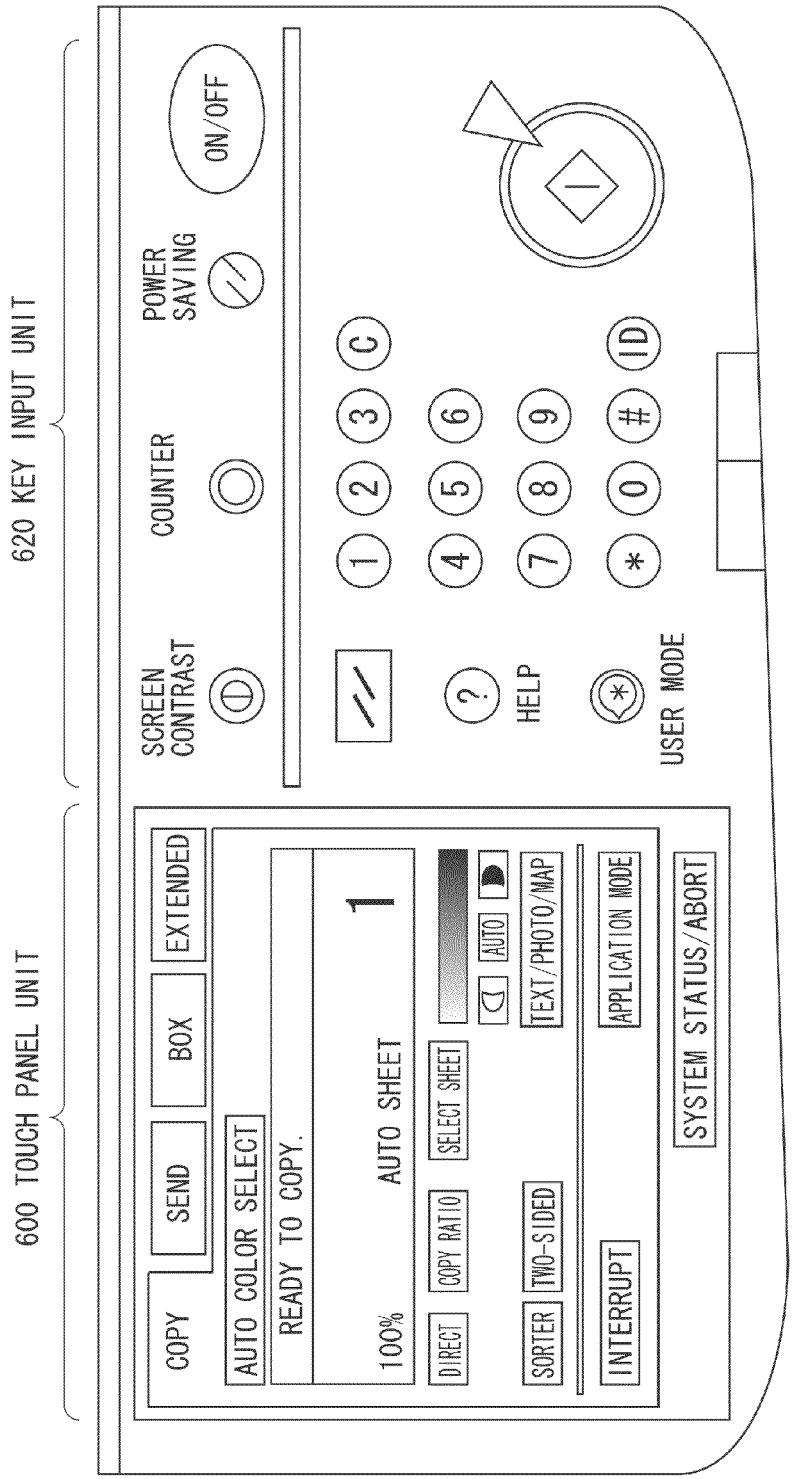

FIGS. 6A and 6B are plan views illustrating a configuration of the operation unit 5 illustrated in FIG. 1.

FIG. 6A illustrates the operation unit 5 of the image forming apparatus 1. The operation unit 5 includes a key input unit 620 and a touch panel unit 600. The touch panel unit 600 includes a liquid crystal display (LCD) and a transparent electrode pasted thereon. The image forming apparatus 1 is programmed in advance so that, when the user touches a portion of the transparent electrode corresponding to a key displayed on the LCD with a finger, the touch is detected to display another operation screen. The present screen example illustrates an initial screen in a standby mode. Various operation screens can be displayed according to setting operations.

FIG. 6B illustrates essential parts of the key input unit 620 in detail. The key input unit 620 is a key input section on which the user can make regular operation settings.

An operation unit power switch 621 is intended to switch between the power-on state of FIG. 5A and the power saving state of FIG. 5B. The operation unit power switch 621 can be controlled when a main power switch for supplying power to the entire job processing system is on.

A power saving key 622 is used to lower the control temperature of a fixing device in the power-on state to suppress power consumption, though it takes longer to enter a printable state. The control temperature may be lowered by setting a power saving rate. A start key 623 is a key for issuing an instruction to start copying or transmission. A stop key 624 is a key for quitting such operations.

A numeric keypad 625 includes keys for registering numbers for various settings. A clear key 626 is a key for cancelling such number registration. An identification (ID) key 627 is a key for inputting a preset password to authenticate the user of the image forming apparatus 1. A reset key 628 is a key for cancelling various settings to restore a default state.

A help key 629 is a key for displaying guidance or help. A user mode key 630 is a key for entering a user-specific system setting screen. A network and an illuminance detection function (FIG. 7A) can be set on the system setting screen.

A counter check key 631 is a key for displaying the number of output sheets which is stored in a software counter for counting the number of printed sheets. The software counter is included in the image forming apparatus 1.

The numbers of output sheets can be displayed according to an operation mode, such as copy, print, scan, and facsimile, a color mode, such as color and monochromatic, and a paper size, such as large and small.

A screen contrast dial 632 is a dial for adjusting the viewability of the screen by controlling an amount of the LCD backlight in the touch panel unit 600.

An execution/memory lamp 633 blinks to inform the user that a job is under execution or a memory access is in process. An error lamp 634 blinks to inform the user of a failure of job execution, an error that requires a serviceperson call, or an operator due to a paper jam or a shortage of consumables.

Power control of the image forming apparatus 1 to which the illuminance detection unit 10 is connected will be described below with reference to FIGS. 7A and 7B to 11.

Figure 7A:
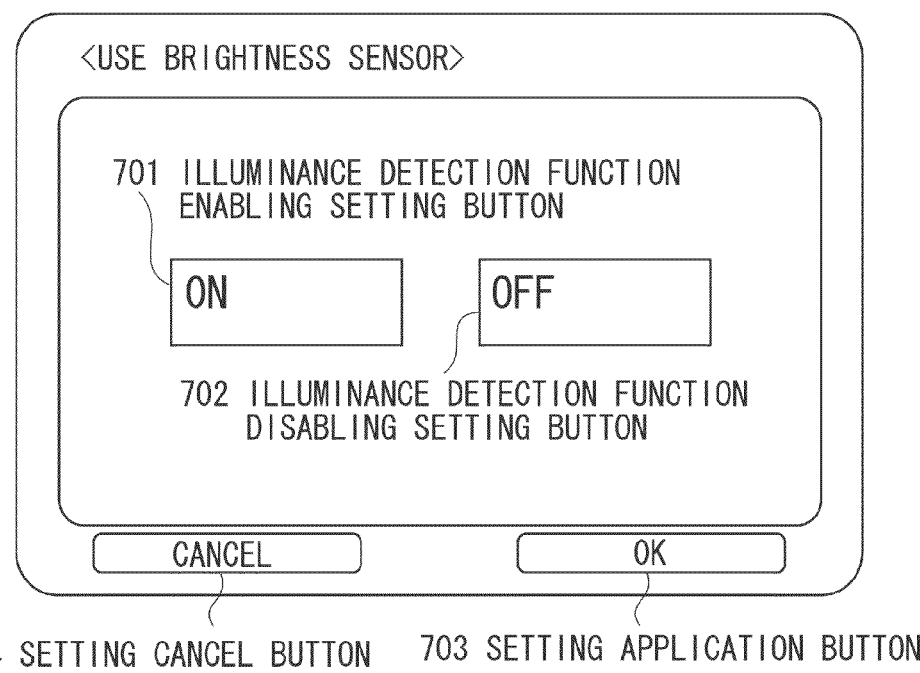
FIGS. 7A and 7B are diagrams illustrating examples of a user interface (UI) screen displayed on a touch panel unit.
Figure 7B:
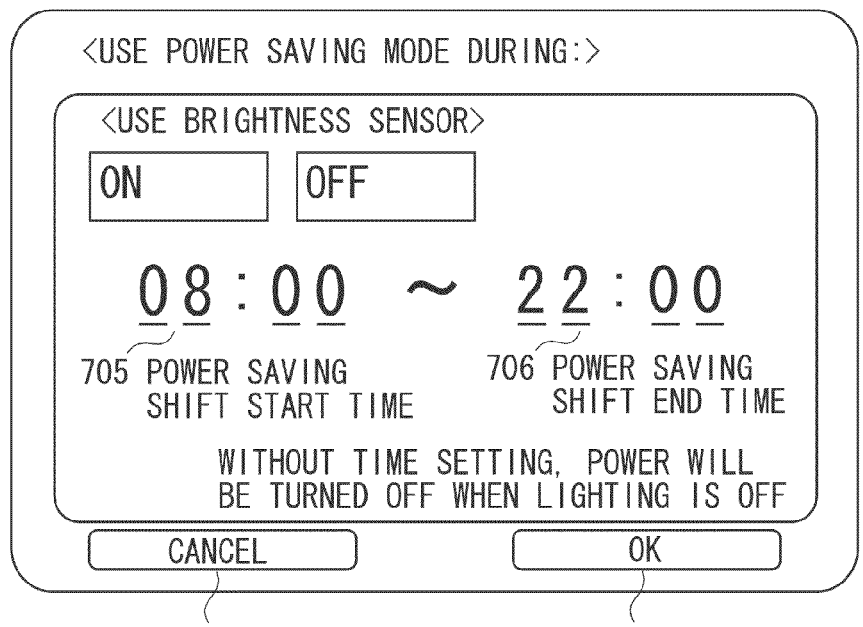

FIGS. 7A and 7B are diagrams illustrating examples of user interface screens displayed on the touch panel unit 600 illustrated in FIG. 6A. FIG. 7A illustrates an illuminance detection function setting screen. FIG. 7B illustrates a power saving state shift time setting screen.

FIG. 8 is a flowchart illustrating a method for controlling the job processing apparatus according to the present exemplary embodiment. The present example deals with power control of the image forming apparatus 1 adaptive to detected illuminance. The steps are implemented by the CPU 201 loading a control program into the memory 203 and executing the same.

First, the user operates the user mode key 630 to enter the system setting screen, and requests the illuminance detection function setting screen.

In step S801, the CPU 201 displays the illuminance detection function setting screen illustrated in FIG. 7A on the touch panel unit 600 in response to the foregoing request.

Next, the user operates an illuminance detection function enabling setting button 701 or an illuminance detection function disabling setting button 702 on the illuminance detection function setting screen illustrated in FIG. 7A to select whether to enable or disable the function. To apply the setting, the user presses a setting application button 703. Not to apply the setting, the user presses a setting cancel button 704. The CPU 201 accepts information about the button(s) operated by the user.

In step S802, the CPU 201 receives a notification of operation information about the operation unit 5, and determines whether an illuminance detection function is set to be enabled or disabled. If the CPU 201 determines that the illuminance detection function is set to be enabled (YES in step S802), then in step S803, the CPU 201 sets an illuminance detection function setting flag on the nonvolatile memory 205.

In step S804, the CPU 201 makes a setting to receive a notification from the illuminance detection unit 10. In step S805, the CPU 201 displays the power saving state shift time setting screen illustrated in FIG. 7B on the touch panel unit 600.

On the power saving state shift setting screen of FIG. 7B, the user inputs a power saving shift start time 705 and a power saving shift end time 706 on the numeric keypad 625. To cancel the set power saving shift start time 705 and power saving shift end time 706, the user presses a setting cancel button 708.

In step S806, the CPU 201 determines whether the user has input the power saving shift start and end times 705 and 706 by using the operation unit 5 to set a power saving shift time by using a setting application button 707. If the CPU 201 determines that the power saving shift time is set (YES in step S806), then in step S807, the CPU 201 sets a power saving shift time setting flag on the nonvolatile memory 205. In step S808, the CPU 201 sets the power saving shift time into the nonvolatile memory 205, and the present processing ends.

FIG. 9 is a flowchart illustrating a method for controlling the job processing apparatus according to the present exemplary embodiment. The present example provides a processing example when the illuminance detection function is enabled. The steps are implemented by the CPU 201 loading a control program into the memory 203 and executing the same. The following description deals with a control to shift a power supply state of the power supply unit 302 to a power saving state lower than a normal state, if the time at which the level of the illuminance detected by the illuminance detection unit 10 is determined to be lower than a predetermined threshold falls within a power saving shift time period. The following description also deals with a control to shift the power supply state of the power supply unit 302 to a power-off state, if the time at which the level of the illuminance detected by the illuminance detection unit 10 is determined to be lower than the predetermined threshold does not fall within the power saving shift time period. The time period is configured to be settable by the user by using the UI screen illustrated in FIG. 7B. The time period refers to a time period during which the state of the power supplied from the power supply unit 302 is shifted to the power saving state lower than a normal state in power consumption. The user can arbitrarily select whether to enable the setting by using the UI screen illustrated in FIG. 7A.

In step S901, when the illuminance detection function is enabled, the illuminance detection units 10 detects that the ambient illuminance of the image forming apparatus 1 is lower than or equal to a threshold, and the CPU 201 detects that the state is notified. In step S902, the CPU 201 checks whether the power saving shift time setting flag is set on the nonvolatile memory 205.

If the CPU 201 determines that the power saving shift time setting flag is set (YES in step S902), then in step S903, the CPU 201 acquires the power saving shift time set in the nonvolatile memory 205. In step S904, the CPU 201 acquires the current time from the RTC 211. In step S905, the CPU 201 determines whether the current time falls within the power saving shift time.

If the CPU 201 determines that the current time falls within the power saving shift time (YES in step S905), then in step S906, the controller 3 stops the power supply through the power cables 307 and 310 by using the power supply remote signal 306 to shift the job processing apparatus to the power saving state illustrated in FIG. 5B, and the present processing ends.

On the other hand, if the power saving shift time setting flag is determined not to be set (NO in step S902), or, if the current time is determined to fall outside the power saving shift time (NO in step S905), the controller 3 performs system shutdown processing. After the completion of the processing, the power supply through the power cables 307 to 310 is stopped. The power supply through the power cable 311 is started to turn off the toggle power switch 301 by using a solenoid switch 317. In step S907, the image forming apparatus 1 shifts to the power-off state of FIG. 5, and the present processing ends.

For reference, the illuminance in a typical fluorescent-lighted office is approximately 400 lux (lx). When the fluorescent lighting is turned off, the illuminance becomes approximately 30 lx.

Detecting the illuminance of 30 lx, the illuminance detection sensor 101 converts the illuminance into a photocurrent. The illuminance detection controller 102 converts the photocurrent into a voltage value. If the voltage value is lower than or equal to a predetermined level, the illuminance detection unit 10 issues a notification to the CPU 201. The predetermined level, or threshold, of the illuminance detection unit 10 may be configured to be settable by the user by using the operation unit 5 or an external apparatus, such as the computer 9.

FIG. 10 is a flowchart illustrating a method for controlling the job processing apparatus according to the present exemplary embodiment. The present example provides a processing example in the power saving state illustrated in FIG. 5B. The steps are implemented by the CPU 201 loading a control program into the memory 203 and executing the same.

In step S1001, the image forming apparatus 1 shifts from the power saving state to the power-on state. In step S1002, the CPU 201 determines which operation the user has made to shift the image forming apparatus 1 to the power-on state, based on a power-on pattern. Note that such a shift occurs when the user has pressed the operation unit power switch 621 or when the image foregoing apparatus 1 has received an instruction from outside like a job from the computer 9 through the LAN 8.

If the power-on pattern is determined to be pattern 1 (PATTERN 1 in step S1002), then in step S1003, the CPU 201 determines that the user has operated the operation unit power switch 621. The CPU 201 maintains the power-on state regardless of the ambient illuminance of the image forming apparatus 1.

If, in step S1002, the power-on pattern is determined to be pattern 2 (PATTERN 2 in step S1002), then in step S1004, the CPU 201 determines that a job has been received. In step S1005, the CPU 201 refers to the set values of the nonvolatile memory 205 to determine whether the illuminance detection function setting flag is set. If the CPU 201 determines that the illuminance detection function setting flag is set (YES in step S1005), then in step S1006, the CPU 201 receives a notification from the illuminance detection unit 10.

In step S1007, the CPU 201 determines whether the level of the luminance detected by the luminance detection unit 10 is lower than or equal to a predetermined threshold. If the CPU 201 determines that the detected luminance is lower than or equal to the predetermined level (YES in step S1007), then in step S1008, the CPU 201 determines whether the power saving shift time setting flag is set on the nonvolatile memory 205. If the power saving shift setting time flag is determined to be set (YES in step S1008), then in step S1009, the CPU 201 acquires the power saving shift time. In step S1010, the CPU 201 acquire the current time from the RTC 211.

In step S1011, the CPU 201 determines whether the current time falls within the power saving shift time. If the current time is determined not to fall within the power saving shift time (NO in step S1011), the processing ends. On the other hand, if the CPU 201 determines that the current time falls within the power saving shift time (YES in step S1011), then in step S1012, the image forming apparatus 1 completes job processing. In step S1013, the image forming apparatus 1 shifts to the power saving state illustrated in FIG. 5B again, and then, the present processing ends. If the CPU 201 makes a "NO" determination in step S1005, S1007, or S1011 (NO in step S1005, S1007, S1008, or S1011), the processing ends.

Figure 11B:
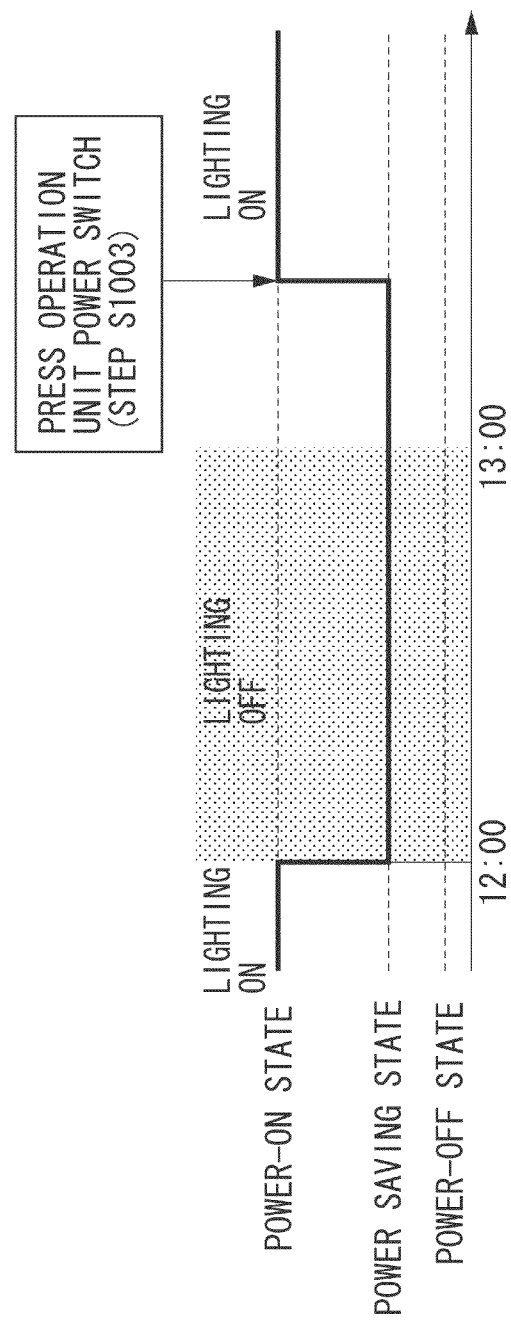

FIGS. 11A, 11B, and 11C are time charts illustrating power transitions of the job processing apparatus illustrated in FIG. 1. As described above, the job processing apparatus according to the present exemplary embodiment is an image forming apparatus. FIG. 11A illustrates power transitions for 24 hours a day.

The present example provides a power transition example of the image forming apparatus 1, where the illuminance detection function is enabled and the power saving state shift time set by the user, or user-specified time, is 8:00 to 22:00. In that time period, the image forming apparatus 1 shifts from the power saving state to the power-on state when the user presses the operation unit power switch 621 (step S1003).

If the ambient lighting of the image forming apparatus 1 is determined to be off (the illuminance detection unit 10 detects an illuminance lower than or equal to the threshold) in the time period of 8:00 to 22:00, the image forming apparatus 1 shifts to the power saving state. If the lighting is detected to be off in time periods other than the foregoing, the image forming apparatus 1 shifts to the power-off state.

FIG. 11B illustrates a transition example where the lighting is turned off at 12:00, i.e., during the specified time. The illuminance detection unit 10 notifies the CPU 201 that the lighting is detected to be off at 12:00. The CPU 201 performs the processing of FIG. 10, and the image forming apparatus 1 shifts from the power-on state to the power saving state with the illustrated power transition.

As described above, a shift from the power saving state to the power-on state occurs when a job is received from outside or the operation unit power switch 621 is pressed. When the lighting is turned on at 13:00, the image forming apparatus 1, therefore, will not shift to the power-on state.

FIG. 11C is a time chart where the lighting is turned off at 22:30, i.e., outside the specified time.

The illuminance detection unit 10 notifies the CPU 201 that the lighting is detected to be off at 22:30. The CPU 201 performs the processing of FIG. 9, and the image forming apparatus 1 shifts from the power-on state to the power-off state with the illustrated power transition.

In FIGS. 11A, 11B, and 11C, the image forming apparatus 1 shifts to the power saving state or the power-off state immediately after the lighting is detected to be off. In other words, the image forming apparatus 1 reacts even when the lighting is instantaneously turned off. The image forming apparatus 1 may be configured to make a power transition after a certain time (several minutes or so) has elapsed since the lighting is detected to be off. The time to elapse may be set by the user on the operation unit 5 or from the computer 9 through the LAN 8.

As described above, the job processing apparatus according to the present exemplary embodiment includes an acceptance unit configured to accept power supply restoration instructions for executing a job processing request. As an example, the input from the operation unit power switch 621 is a first power restoration instruction. As another example, a second power restoration instruction is reception of a command instruction that indicates the reception of a job from an external device. In other words, the present exemplary embodiment is configured so that the first and second power supply restoration instructions of different attributes for executing a job processing request can be accepted.

If the CPU 201 determines that the time, at which the first power supply restoration instruction is accepted, falls within the time period, the CPU 201 performs control to shift the power supply state to a normal state, and, after the end of job processing, maintain the normal state. The first power supply restoration instruction refers to an ON instruction issued from the operation unit power switch 621 operated by the user.

If the CPU 201 determines that the time, at which the second power supply restoration instruction is accepted, falls within the time period, the CPU 201 performs control to shift the power supply state to the normal state, and, after the end of job processing, shift the power supply state to the power saving state.

This realizes power supply control that satisfies both a demand for power saving and a demand for prompt job processing in a manner adaptive to changes in the ambient illuminance of the job processing apparatus.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-043960 filed Feb. 29, 2012, which is hereby incorporated by reference herein in its entirety.

What is claimed is:

1. An information processing apparatus comprising:
a detection unit configured to detect brightness around the information processing apparatus;
a setting unit configured to set a time period for shifting the information processing apparatus to a power saving state;
an acquiring unit configured to acquire a current time in a case where the brightness detected by the detection unit is lower than a threshold; and
a control unit configured to shift the information processing apparatus to the power saving state in a case where the current time acquired by the acquiring unit is within the time period set by the setting unit, and shift the information processing apparatus to a power-off state in a case where the current time acquired by the acquiring unit is not within the time period set by the setting unit.

2. The information processing apparatus according to claim 1, further comprising an acceptance unit configured to accept an instruction for restoring the information processing apparatus to a power-on state.

3. The information processing apparatus according to claim 2, wherein the control unit is configured to, if the instruction accepted by the acceptance unit is issued by an operation on a power switch, restore the information processing apparatus to the power-on state and then maintain the information processing apparatus in the power-on state.

4. The information processing apparatus according to claim 2, wherein the control unit is configured to, if the instruction accepted by the acceptance unit is issued by an input of a job, restore the information processing apparatus to the power-on state, and then process the job and shift the information processing apparatus to the power saving state.

5. The information processing apparatus according to claim 1, further comprising an image forming unit configured to form an image based on image data.

6. The information processing apparatus according to claim 1, wherein the control unit is further configured to, if the time period is not set by the setting unit, when the brightness detected by the detection unit is lower than the threshold, shift the information processing apparatus to the power-off state.

7. The information processing apparatus according to claim 1, wherein power is supplied to a network interface unit receiving data from an external device in the power saving state, but power is not supplied to the network interface unit in the power-off state.

8. The information processing apparatus according to claim 1, wherein power is not supplied to the control unit in the power saving state.

9. A method for controlling an information processing apparatus, the method comprising:
detecting brightness around the information processing apparatus;
setting a time period for shifting the information processing apparatus a power saving state;

acquiring a current time in a case where detected brightness is lower than a threshold; and shifting the information processing apparatus to the power saving state in a case where the acquired current time is within the set time period, and shifting the information processing apparatus to a power-off state in a case where the acquired current time is not within the set time period.

10. A non-transitory computer-readable storage medium storing a program that causes an information processing apparatus to execute a method comprising:

detecting brightness around the information processing apparatus;

setting a time period for shifting the information processing apparatus a power saving state;

acquiring a current time in a case where detected brightness is lower than a threshold; and shifting the information processing apparatus to the power saving state in a case where the acquired current time is within the set time period, and shifting the information processing apparatus to a power-off state in a case where the acquired current time is not within the set time period.

* * * * *